United States Patent
Sinnema (10) Patent No.: US 9,992,213 B2
(45) Date of Patent: *Jun. 5, 2018

(54) RISK-ADAPTIVE ACCESS CONTROL OF AN APPLICATION ACTION BASED ON THREAT DETECTION DATA

(71) Applicant: EMC Corporation, Hopkinton, MA (US)

(72) Inventor: Rémon Sinnema, Houten (NL)

(73) Assignee: EMC Corporation, Hopkinton, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/957,406

(22) Filed: Dec. 2, 2015

(65) Prior Publication Data

US 2016/0088005 A1 Mar. 24, 2016

Related U.S. Application Data

(63) Continuation of application No. 13/852,865, filed on Mar. 28, 2013, now Pat. No. 9,240,996.

(51) Int. Cl.
*H04L 29/06* (2006.01)

(52) U.S. Cl.
CPC .......... *H04L 63/1416* (2013.01); *H04L 63/10* (2013.01); *H04L 63/102* (2013.01); *H04L 63/105* (2013.01); *H04L 63/1425* (2013.01); *H04L 63/20* (2013.01)

(58) Field of Classification Search
CPC ...................................................... H04L 63/10
USPC .......................................... 726/1, 3, 4, 8, 12
See application file for complete search history.

(56) References Cited

U.S. PATENT DOCUMENTS

| | | | | |
|---|---|---|---|---|
| 7,454,794 B1* | 11/2008 | Hibberd | ................ | G06F 21/313 709/217 |
| 7,921,288 B1* | 4/2011 | Hildebrand | ............. | H04L 63/04 713/165 |
| 7,921,450 B1* | 4/2011 | Vainstein | ............ | G06F 21/6209 380/285 |
| 8,131,825 B2* | 3/2012 | Nord | ................. | G06F 17/30067 709/219 |
| 8,176,527 B1* | 5/2012 | Njemanze | ............. | G06F 21/554 709/223 |
| 8,387,115 B2* | 2/2013 | Park | ..................... | G06F 21/6218 726/3 |
| 8,749,343 B2* | 6/2014 | Cirker | ............. | G08B 13/19652 340/3.1 |
| 8,779,920 B2* | 7/2014 | Garnier | .................. | G08B 21/12 340/436 |
| 8,813,236 B1* | 8/2014 | Saha | .................... | H04L 63/1408 726/22 |
| 2002/0066034 A1* | 5/2002 | Schlossberg | .......... | G06F 21/552 726/23 |

(Continued)

*Primary Examiner* — Haresh N Patel
(74) *Attorney, Agent, or Firm* — Van Pelt, Yi & James LLP (57) ABSTRACT

Risk-adaptive access control techniques are disclosed. In various embodiments, a value for a threat level attribute is determined based at least in part on threat detection data generated by a security system or process. The determined value for the threat level attribute is used to make, at least in part, an access control decision with respect to a request to access the resource. In various embodiments, the threat level attribute is used as an environment attribute provided as input to an XACML-based access control system.

21 Claims, 5 Drawing Sheets

(56) References Cited

U.S. PATENT DOCUMENTS

| | | | | |
|---|---|---|---|---|
| 2005/0193429 | A1* | 9/2005 | Demopoulos | H04L 63/0254 726/23 |
| 2005/0273851 | A1* | 12/2005 | Raju Datla | H04L 63/1433 726/14 |
| 2006/0069668 | A1* | 3/2006 | Braddy | G06F 17/30867 709/217 |
| 2006/0206615 | A1* | 9/2006 | Zheng | H04L 63/0227 709/229 |
| 2007/0289019 | A1* | 12/2007 | Lowrey | G06F 21/554 726/24 |
| 2007/0300306 | A1* | 12/2007 | Hussain | G06F 21/6218 726/27 |
| 2008/0104046 | A1* | 5/2008 | Singla | G06F 17/30333 707/999.004 |
| 2009/0077621 | A1* | 3/2009 | Lang | H04L 63/20 726/1 |
| 2009/0207020 | A1* | 8/2009 | Garnier | G08B 21/12 340/541 |
| 2009/0235334 | A1* | 9/2009 | Park | H04L 63/102 726/4 |
| 2010/0037323 | A1* | 2/2010 | Lemieux | G06F 21/57 726/26 |
| 2010/0050244 | A1* | 2/2010 | Tarkhanyan | G06F 21/57 726/7 |
| 2010/0100972 | A1* | 4/2010 | Lemieux | G06F 21/57 726/34 |
| 2010/0257598 | A1* | 10/2010 | Demopoulos | H04L 63/0254 726/13 |
| 2011/0231221 | A1* | 9/2011 | Worwetz | G06Q 10/06 705/7.28 |
| 2012/0210388 | A1* | 8/2012 | Kolishchak | G06F 21/552 726/1 |
| 2012/0233656 | A1* | 9/2012 | Rieschick | H04L 63/1441 726/1 |
| 2012/0314063 | A1* | 12/2012 | Cirker | G08B 13/19652 348/143 |
| 2013/0221094 | A1* | 8/2013 | Smith | G07C 9/00309 235/382 |
| 2014/0047532 | A1* | 2/2014 | Sowatskey | G06F 21/335 726/10 |
| 2014/0165140 | A1* | 6/2014 | Singla | G06F 11/3006 726/1 |
| 2014/0165200 | A1* | 6/2014 | Singla | G06F 21/56 726/23 |
| 2015/0186668 | A1* | 7/2015 | Whaley | G06F 21/6218 713/156 |
| 2015/0200948 | A1* | 7/2015 | Cairns | G06F 21/44 726/4 |

\* cited by examiner

FIG. 1

(RELATED ART)

RISK-ADAPTIVE ACCESS CONTROL OF AN APPLICATION ACTION BASED ON THREAT DETECTION DATA

CROSS REFERENCE TO OTHER APPLICATIONS

This application is a continuation of U.S. patent application Ser. No. 13/852,865, now U.S. Pat. No. 9,240,996, entitled METHOD AND SYSTEM FOR RISK-ADAPTIVE ACCESS CONTROL OF AN APPLICATION ACTION filed Mar. 28, 2013 which is incorporated herein by reference for all purposes.

BACKGROUND OF THE INVENTION

Risk-Adaptive Access Control (RAdAC) is an access control model that incorporates dynamic information about threat levels and security risks. The model contemplates providing a way to set up access control policies that take this dynamic information into account, so that whenever an intrusion is detected, access privileges are automatically lowered.

The extensible access control markup language (XACML) is an OASIS standard which defines a declarative access control policy language implemented in XML and a processing model describing how to evaluate authorization requests according to the rules defined in policies. XACML is primarily an attribute-based control system, in which attributes concerning users, actions, resources, and the operating environment are evaluated to determine whether a user may access a given resource in a particular way.

Intrusion detection systems (IDS), network monitoring tools such as RSA® NetWitness®, and other threat assessment and detection tools are available, but typically when a threat is detected an administrator receives a notification and must take responsive action manually to adjust (e.g., revoke) user privileges in response to a detected threat.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A risk-adaptive access control system is disclosed. In various embodiments, threat detection data generated by one or more network security tools is evaluated to determine one or more threat level attributes. The threat level attribute(s) is/are provided as inputs to a XACML-based access control decision-making process. The XACML-based access control decision-making process uses the threat level attribute(s) as environment attribute(s) in making access control decisions. In various embodiments, administrative user-defined security policies provide for access levels to be determined (adjusted) dynamically based at least in part on current values for the environment attribute(s). The security policies may specify a graceful degradation of access to be implemented based at least in part on the environment attribute(s).

Figure 1:
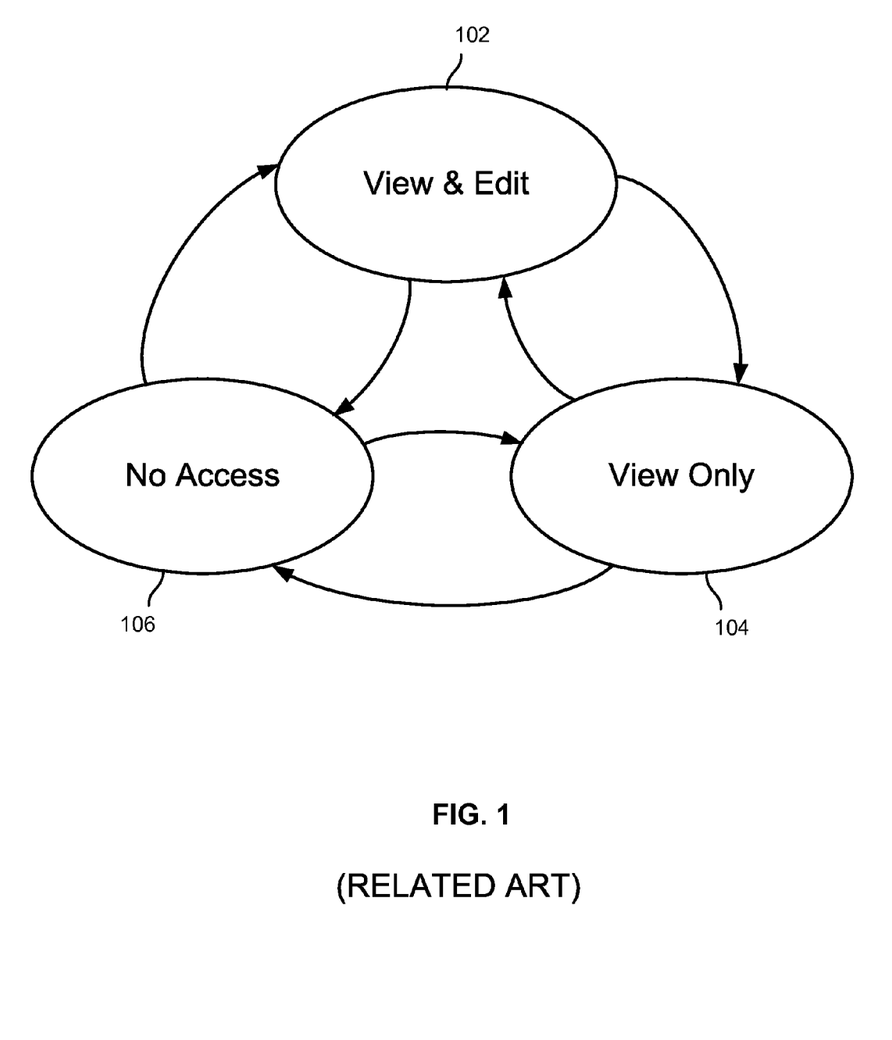
FIG. 1 is a state diagram illustrating an embodiment of a risk-adaptive access control system.

FIG. 1 is a state diagram illustrating an embodiment of a risk-adaptive access control system. As noted above, Risk-Adaptive Access Control (RAdAC) is an access control model that incorporates dynamic information about threat levels and security risks. It provides a way to set up access control policies that take this dynamic information into account, so that whenever an intrusion is detected, access privileges are automatically lowered. In the example shown in FIG. 1, for example, when in a first state 102 corresponding to a first threat level associated with relatively low risk, a given user or class of user, based on role for example, may have access rights that include the ability to view and edit a certain document or class of documents, for example by document type, classification, or other attribute. An increase in the threat level to a threat level associated with heightened risk but not the highest level of risk, indicated explicitly for example via an administrative user interface or determined at least in part programmatically, for example based on threat data generated by one or more security systems, such as and without limitation an intrusion detection system (IDS), a network monitoring system, etc., may result in the system advancing to a second state 104, in which for example the same user(s) may be granted only limited access to view, but not edit, the same documents they were previously able to view and access when the system was in the first state 102. Finally, detection of a third threat level requiring a highest state of security may result in a transition to a third state 106, in which users previously allowed to view content when in state 104 and to view and/or edit the same content in state 102 will be denied access to that same content. In various embodiments, as the detected threat level decreases, a transition from the third state 106 back to the intermediate state 104, or directly to the first state 102 if conditions warrant, may occur. Likewise, once in intermediate state 104 a transition back to the first state 102 may occur, for example if the detected threat level were to decrease.

In various embodiments, a risk-adaptive access control system requires all protected systems to externalize their access control implementations, so they can all use the same policies. Externalizing access control gives many other advantages as well, like harmonizing policies across applications, which lowers maintenance costs while increasing security.

Figure 2:
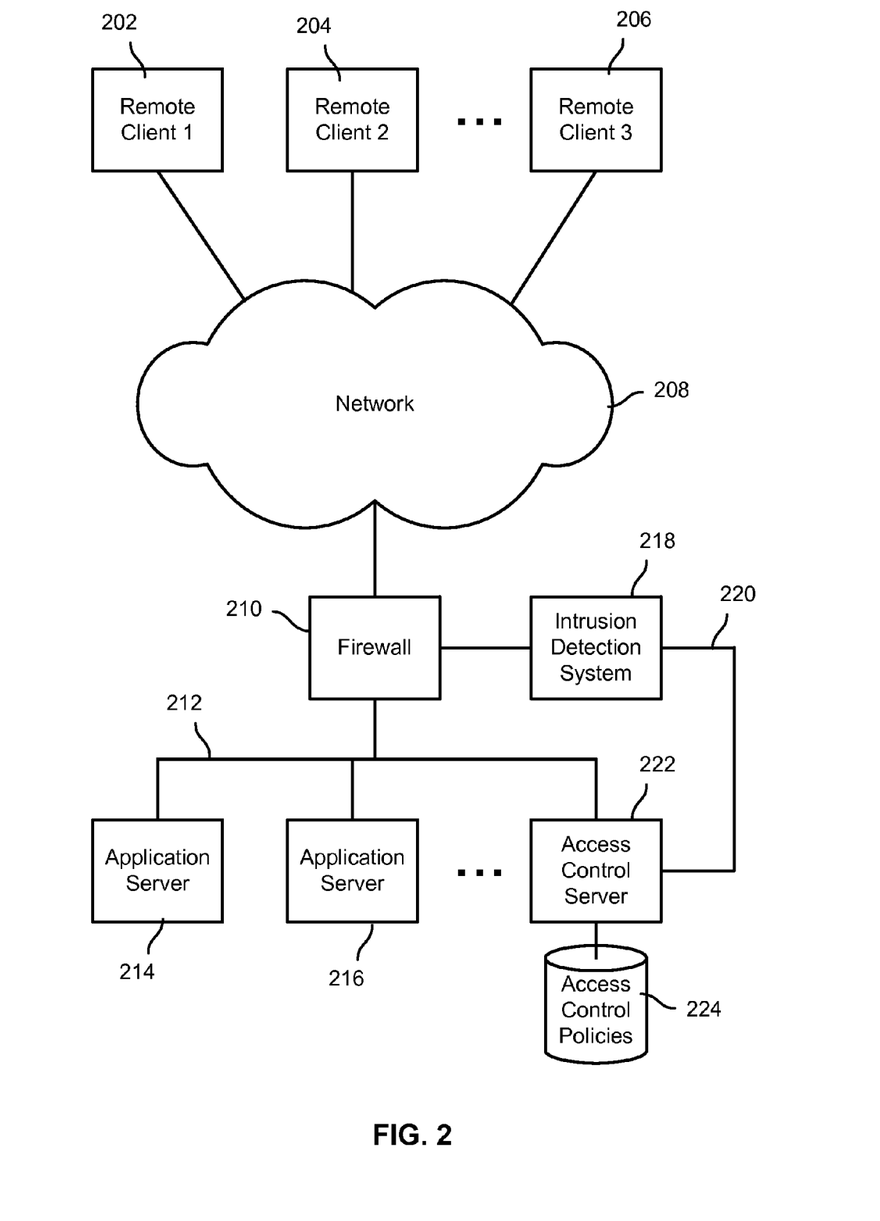
FIG. 2 is a block diagram illustrating an embodiment of a risk-adaptive access control system.

FIG. 2 is a block diagram illustrating an embodiment of a risk-adaptive access control system. In the example shown, a plurality of remote client systems represented in FIG. 2 by remote clients 202, 204, and 206 connect via a network 208, such as the Internet, via a firewall 210, to an internal network 212, such as a corporate or other enterprise local area network (LAN). Users of remote clients such as clients 202, 204, and 206, and/or of local clients on network 212, access application servers 214 and 216, for example, to perform application actions, such as to send/receive email or other communications; to retrieve, create, modify, delete, and/or otherwise access documents, files, or other application objects, etc. An intrusion detection system 218 monitors network traffic received at firewall 218 and perform intrusion detection processing, e.g., by comparing observed data to a set of threat signatures, by comparing observed aggregate and/or individual activity against a baseline or model of normal activity observed in a prior learning period, etc.

In the example shown in FIG. 2, access control functions of the applications running on application servers such as servers 214 and 216 have been externalized. The applications in this example communicate via network 212 with a centralized access control server 222. The access control server 222 evaluates information comprising and/or otherwise associated with an access request, in light of access control policies stored in a database 224 and real-time, dynamic threat assessment data received from IDS 218 via a connection 220, and/or from one or more other network security nodes not shown in FIG. 2, to make decisions to grant or deny access to a resource (e.g., a document or other file or object) by a requesting user (e.g., by user identity, role, etc.) in light of a current environment and/or context, including for example a threat level determined and/or indicated at least in part by threat level data received from one or more network security systems, such as IDS 218, and in some embodiments to determine whether to permit a specific action or set of available actions to be permitted based on the request. For example, referring further to FIG. 1, in some embodiments, the access control server 222 may respond to an access request, received for example from and/or with reference to an application running on application server 214 and/or 216, with one of three responses, each corresponding to one of the states 102, 104, or 106 of FIG. 1, based at least in part on threat level data received and/or determined based on data received from IDS 218 and/or one or more other network or other security systems.

In various embodiments, a risk-adaptive access control system may be implemented using components based on the eXtensible Access Control Markup Language (XACML).

Figure 3:
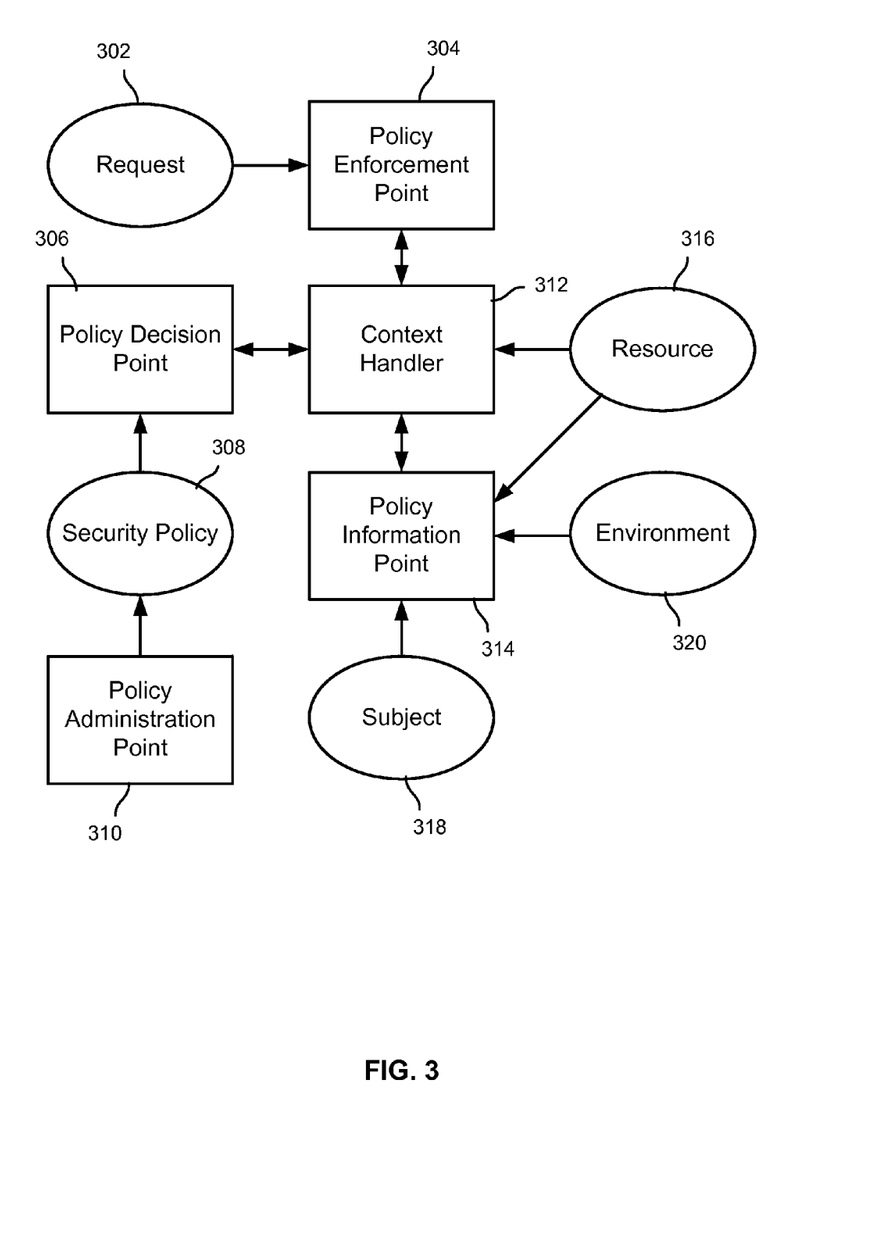
FIG. 3 is a block diagram illustrating an embodiment of elements comprising an XACML-based system.

FIG. 3 is a block diagram illustrating an embodiment of elements comprising an XACML-based system. The XACML architecture identifies separate components. Each resource access request 302 is processed using the architecture shown in FIG. 3. The Policy Enforcement Point (PEP) 304 in various embodiments is a small piece inside an application that defers decisions to an external Policy Decision Point (PDP) 306, such as access control system 222 of FIG. 2. The PDP 306 works with policies 308 created using an external Policy Administration Point (PAP) 310 and matches them with the request from the PEP. Additional information is retrieved from a Policy Information Point (PIP) 314 via a context handler 312. XACML policies and requests model all information as attributes for subjects 318 (e.g. username, role), resource 316 (e.g. document, folder), action (e.g. read), and environment 320 (e.g. from iPad, at 7 PM). In various embodiments, threat and security risk levels are represented as environment attributes, provided by a PIP 314, such as a PIP comprising and/or connected to an IDS or other network security system. The PIP 314 in various embodiments extracts information from and IDS and/or other such systems (e.g. RSA® enVision® and/or NetWitness®) that is matched against centralized access control policies that lower access privileges when an intrusion is detected (or suspected).

Figure 4:
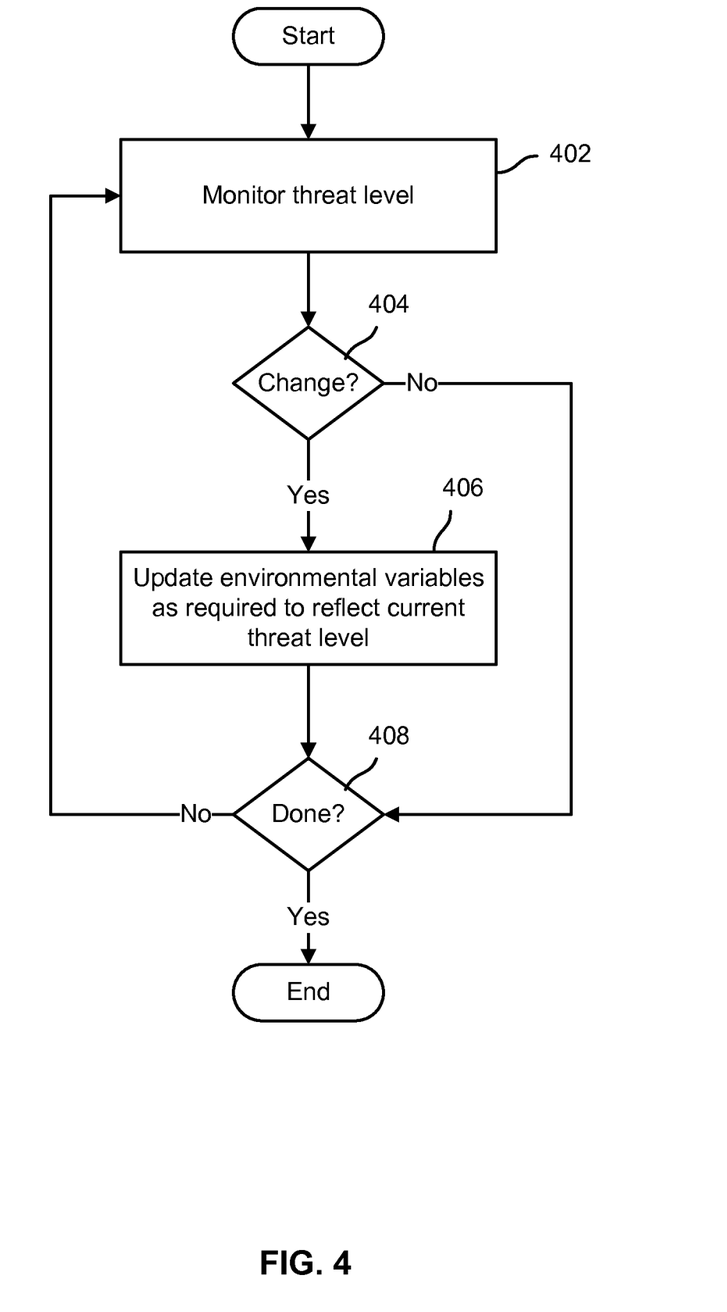
FIG. 4 is a flow chart illustrating an embodiment of a risk-adaptive access control process.

FIG. 4 is a flow chart illustrating an embodiment of a risk-adaptive access control process. In the example shown, a threat level is monitored (402). In various embodiments, threat data provided as output by one or more security systems and/or processes, such as an IDS, etc., are received. Threat data may include alerts, indications that specific threats have been detected, numerical or other values representing a determined current level of threat based on observed and/or processed data such as number, sender and/or receiver of network communications; degree recently observed behavior deviates from a model or baseline of "normal" behavior not associated with heightened risk; number or character of anomalous events; a severity or other security system generated assessment of the magnitude or degree of risk posed by a specific detected threat; etc. In some embodiments, raw output generated by one or more security systems is processed and/or transformed to generate corresponding values for one or more "threat level" environment attributes to be provided and used as inputs in an XACML-based risk-adaptive access control system. If a change in threat level is detected (404), one or more environmental variables (e.g., XACML environment attributes) are updated as required to reflect the current threat level (406). The environment attributes are updated, as the detected threat level evolves, until the process of FIG. 4 is done (408), e.g., the risk-adaptive access control system is taken offline, such as for maintenance.

Figure 5:
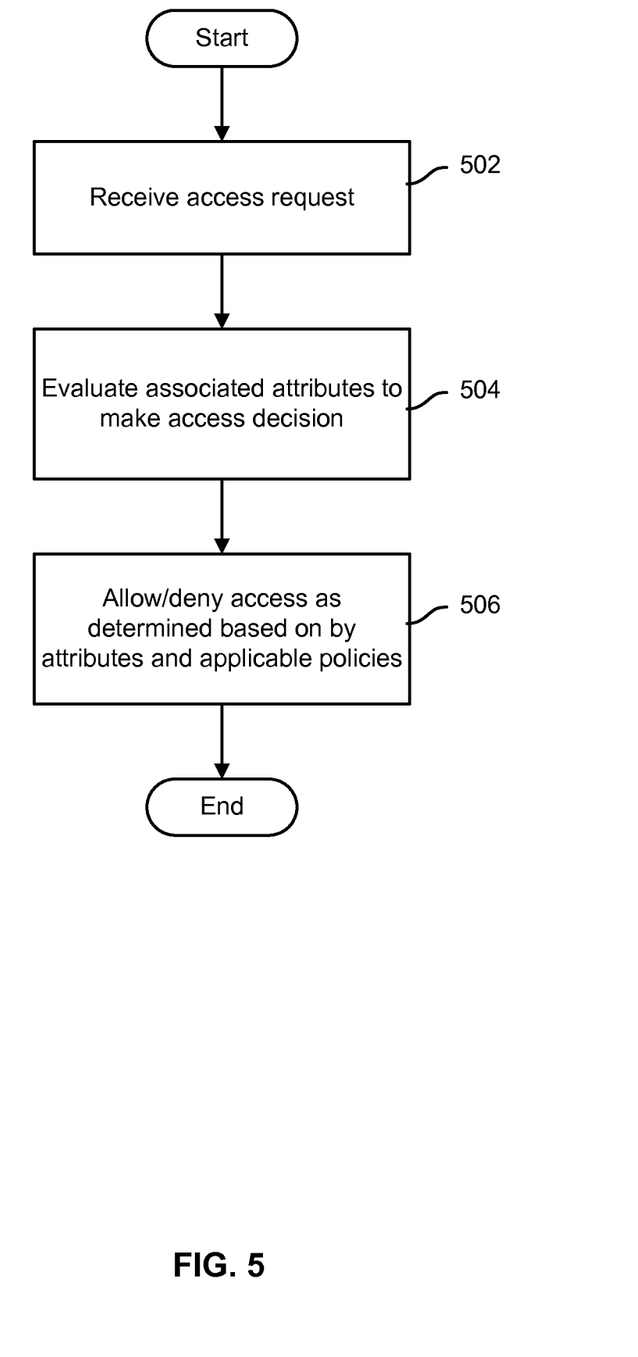
FIG. 5 is a flow chart illustrating an embodiment of a process to perform risk-adaptive access control.

FIG. 5 is a flow chart illustrating an embodiment of a process to perform risk-adaptive access control. In various embodiments, the process of FIG. 5 is implemented by an access control node, such as access control server 222 of FIG. 2. In the example shown in FIG. 5, an access request is received (502). For example, an access request associated with an application user's attempt to perform an action with respect to an application object, e.g., a file, may result in the application sending to the access control system a corresponding access request, which identifies the user, the affected resource (e.g., the file or other object), and the action(s) requested (or which may be requested) to be taken by the user. In some embodiments, one or more environment attributes specific to the user and/or request may be included as well, e.g., identifying a type of device the user is using, the user's geographic location, etc. The request is evaluated in light of its associated attributes (one or more of user, action, resource, and environment attributes, for example) to determine whether the requested access (e.g., read, read/write, etc.) is to be permitted (504). For example, in some embodiments, one or more system-wide environment attributes reflecting a current threat level may be considered. Access is permitted or denied based on the supplied attributes and applicable security policies (506). For example, depending on the value of one or more environment attributes reflecting a current threat level, access may be granted (or denied), as in the example shown in FIG. 1.

Using techniques disclosed herein, risk-adaptive access control may be provided, including by changing access rights dynamically as the prevailing threat level changes over time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of controlling access to a resource, comprising:
   setting one or more security policies for controlling access to the resource of an application running on an application server that is separate from an access control server, wherein the one or more security policies associate each of a plurality of access levels with a corresponding value for a threat level attribute;
   receiving at the access control server from an intrusion detection system, threat detection data, wherein the intrusion detection system monitors network traffic received at a firewall;
   determining, by the access control server, based at least in part on the threat detection data received from the intrusion detection system, a value for the threat level attribute, wherein in the event the value for the threat level attribute indicates a change, one or more environmental attributes are updated, wherein the one or more environmental attributes at least includes a location of the user and a type of device of the client terminal;
   receiving, at the access control server from the application running on the application server that is separate from the access control server, an access request that identifies a user of a client terminal that is separated from the application server by the firewall, the resource of the application subject to the access request, and one or more actions requested associated with the resource of the application in response to the client terminal attempting to perform one or more actions with respect to the resource of the application over a communication network;
   determining, by the access control server, an access level of the plurality of access levels to apply to the resource of the application in response to receiving a request from the client terminal to access the resource over the communication network, wherein the access level is determined based at least in part on one or more of the determined value for the threat level attribute, the identity of the user, the resource of the application subject to the request, the one or more actions requested associated with the resource of the application, and at least one of the one or more security policies; and
   applying the determined access level to the resource of the application.

2. The method of claim 1, wherein determining the access level of the plurality of access levels to apply to the resource includes using the threat level attribute as an environment attribute provided as input to an XACML-based access control system.

3. The method of claim 1, wherein the value for the threat level attribute is determined based at least in part on respective threat detection data generated by a plurality of security systems and/or processes.

4. The method of claim 1, wherein the intrusion detection system (IDS) includes a network monitoring tool.

5. The method of claim 1, wherein determining the access level of the plurality of access levels to apply to the resource includes applying a security policy identified based at least in part on an attribute associated with the access request.

6. The method of claim 1, wherein the access control server determinations are made based at least in part on respective attributes associated with one or more of the following: an action to be performed by the user with respect to the resource and an environment with which one or more of the user, the resource, and the request are associated.

7. The method of claim 1, wherein the access control server determination is based at least in part on a security policy with which the request is associated.

8. The method of claim 1, further comprising generating based on the access control server determination a response to the request to access the resource.

9. The method of claim 8, wherein the response indicates the requested access is allowed with respect to the resource.

10. A system, comprising:
    a processor configured to:
      set one or more security policies for controlling access to a resource of an application running on an application server that is separate from the system, wherein the one or more security policies associate each of a plurality of access levels with a corresponding value for a threat level attribute;
      receive, from an intrusion detection system, threat detection data, wherein the intrusion detection system monitors network traffic received at a firewall;
      determine, based at least in part on the threat detection data received from the intrusion detection system, a value for the threat level attribute, wherein in the event the value for the threat level attribute indicates a change, one or more environmental attributes are updated, wherein the one or more environmental attributes at least includes a location of the user and a type of device of the client terminal;
      receive, from the application running on the application server that is separate from the system, an access request that identifies a user of a client terminal that is separated from the application server by the firewall, the resource of the application subject to the access request, and one or more actions requested associated with the resource of the application in response to the client terminal attempting to perform one or more actions with respect to the resource of the application over a communication network; and
      determine an access level of the plurality of access levels to apply to the resource of the application in response to receiving a request from the client terminal to access the resource over the communication network, wherein the access level is determined based at least in part on one or more of the determined value for the threat level attribute, the identity of the user, the resource of the application subject to the request, the one or more actions requested associated with the resource of the application, and at least one of the one or more security policies;

apply the determined access level to the resource of the application; and a memory or other storage device coupled to the processor and configured to store said threat detection data generated by said intrusion detection system.

11. The system of claim 10, wherein determining the access level of the plurality of access levels to apply to the resource includes using the threat level attribute as an environment attribute provided as input to an XACML-based access control system.

12. The system of claim 10, wherein the value for the threat level attribute is determined based at least in part on respective threat detection data generated by a plurality of security systems and/or processes.

13. The system of claim 10, wherein using the determined value for the threat level attribute to make, at least in part, an access control decision with respect to a request to access the resource includes applying a policy identified based at least in part on an attribute associated with the access request.

14. The system of claim 12, wherein the access control server determination is made based at least in part on respective attributes associated with one or more of the following: an action to be performed by the user with respect to the resource; and an environment with which one or more of the user, the resource, and the request are associated.

15. The system of claim 10, wherein the access control server determination is based at least in part on a security policy with which the request is associated.

16. A computer program product embodied in a tangible, non-transitory computer-readable storage medium, comprising computer instructions for:

setting one or more security policies for controlling access to the resource of an application running on an application server that is separate from an access control server, wherein the one or more security policies associate each of a plurality of access levels with a corresponding value for a threat level attribute;

receiving, at the access control server from an intrusion detection system, threat detection data, wherein the intrusion detection system monitors network traffic received at a firewall;

determining, by the access control server, based at least in part on the threat detection data received from the intrusion detection system, a value for the threat level attribute, wherein in the event the value for the threat level attribute indicates a change, one or more environmental attributes are updated, wherein the one or more environmental attributes at least includes a location of the user and a type of device of the client terminal;

receiving, at the access control server from the application running on the application server that is separate from the access control server, an access request that identifies a user of a client terminal that is separated from the application server by the firewall, the resource of the application subject to the access request, and one or more actions requested associated with the resource of the application in response to the client terminal attempting to perform one or more actions with respect to the resource of the application over a communication network;

determining, by the access control server, an access level of the plurality of access levels to apply to the resource of the application in response to receiving a request from the client terminal to access the resource over the communication network, wherein the access level is determined based at least in part on one or more of the determined value for the threat level attribute, the identity of the user, the resource of the application subject to the request, the one or more actions requested associated with the resource of the application, and at least one of the one or more security policies; and applying the determined access level to the resource of the application.

17. The computer program product of claim 16, wherein determining the access level of the plurality of access levels to apply to the resource includes using the threat level attribute as an environment attribute provided as input to an XACML-based access control system.

18. The compute program product of claim 16, wherein the value for the threat level attribute is determined based at least in part on respective threat detection data generated by a plurality of security systems and/or processes.

19. The computer program product of claim 16, wherein the intrusion detection system includes a network monitoring tool.

20. The computer program product of claim 16, wherein determining the access level of the plurality of access levels to apply to the resource includes applying a security policy identified based at least in part on an attribute associated with the access request.

21. The method of claim 1, further comprising identifying one or more environmental attributes specific to the user in response to the request form the client terminal to access the resource over the network.

* * * * *